(12) United States Patent
Titor

(10) Patent No.: US 6,220,542 B1
(45) Date of Patent: Apr. 24, 2001

(54) POLARIZING FILM TRANSPORT ROLLER

(76) Inventor: Walter Titor, 32 Bungalow Hill Rd., P.O. Box 16, Yulan, NY (US) 12792

( * ) Notice: Subject to any disclaimer, the term of this patent is extended or adjusted under 35 U.S.C. 154(b) by 0 days.

(21) Appl. No.: 09/435,431

(22) Filed: Nov. 8, 1999

(51) Int. Cl.⁷ .............................. B65H 57/04; G03G 19/00
(52) U.S. Cl. .......................... 242/615.3; 492/8; 226/190
(58) Field of Search ........................... 242/615.3, 346.2, 242/615.4, 358; 492/8; 226/190

(56) References Cited

U.S. PATENT DOCUMENTS

| | | | |
|---|---|---|---|
| 1,548,960 | * 8/1925 | Stuber et al. | 242/356.1 |
| 3,149,403 | * 9/1964 | Aurich et al. | 492/8 |
| 3,585,446 | 6/1971 | McKee . | |
| 3,611,028 | 10/1971 | Whitmore . | |
| 4,049,343 | 9/1977 | Hermanson . | |
| 4,392,177 | 7/1983 | Geyken . | |
| 4,517,719 | * 5/1985 | Okumura et al. | 492/8 |
| 4,587,699 | * 5/1986 | Kadomatsu et al. | 492/8 |
| 4,737,809 | 4/1988 | Konno . | |
| 5,188,272 | * 2/1993 | Kanbe et al. | 226/190 |
| 5,216,571 | 6/1993 | Ko . | |
| 5,625,468 | 4/1997 | Oosaka . | |
| 5,938,579 | * 8/1999 | Cavazos | 492/8 |
| 6,105,651 | * 8/2000 | Leana | 492/8 X |

* cited by examiner

Primary Examiner—Michael R. Mansen
(74) Attorney, Agent, or Firm—Sandra M. Kotin

(57) ABSTRACT

A modified film transport roller for use with film handling systems to prevent the sticking and bunching of film due to build-ups of static electric charges on the surface of the film. The modified roller has a strip or layer of magnetized polymeric material applied to the hub between the end supports or collars, but of a thickness less than the height of the collars. The film rests on the collars as it passes over the roller and through the magnetic field, but does not come in contact with the magnetized layer. Static charges are polarized by the magnetic field. As a result of the polarization of the static charges, sections of film are not attracted to one another and the film does not stick or bunch as it moves to and from the projector.

9 Claims, 3 Drawing Sheets

POLARIZING FILM TRANSPORT ROLLER

FIELD OF THE INVENTION

The instant invention relates to rollers for use in polymeric film handling systems, more particularly to film transport rollers which are modified to prevent sticking and bunching of the film due to build-up of static electric charges.

BACKGROUND OF THE INVENTION

Motion picture equipment currently used in theaters utilizes complex film handling systems which require the film to travel considerable distances from the supply reel to the projector and back to the take-up reel. The film also passes over a number of guiding or film transport rollers and through feed controls also utilizing such rollers. A considerable amount of static electricity often builds up on the the film, especially during dry conditions, causing the film to stick and/or bunch. This requires the projectionist to stop and rethread the film, often causing unrest among the theater patrons. Various means have been devised to remove the static electricity and thereby to eliminate this problem.

U.S. Pat. No. 3,585,446 to McKee disclosed a conducting system to dissipate static electric charges that build up on motion picture reels. A plastic spindle covered with a conductive coating was secured to the metal shaft supporting the reel. The coating was in contact with both metal flanges of the reel and with the shaft, enabling the charges to migrate from the reel to the coating and then to the shaft and finally to the projector where the charges were dissipated. The projector preferably was grounded.

Whitmore, in U.S. Pat. No. 3,611,028 disclosed a metal roller with metal stub axles which were supported by the grounded frame of a conveyor system. The metal roller, used to guide a web, particularly photographic film, was covered with a layer of an elastomeric plastic which prevented charges on the metal roller from being imparted to the film.

Rollers, composed of non-magnetic stainless steel, in contact with brushes for grounding, were used in a complex web device color copier photoelectrophoretic imaging machine as taught by Hermanson in U.S. Pat. No. 4,049,343. A conductive web surface, in contact with a roller, was grounded by another set of brushes.

Geyken, in U.S. Pat. No. 4,392,177 described four embodiments of rollers for use with webs, sheets or strips of flexible radiation sensitive material such as X-ray film. The rollers were constructed of a plastic material with imbedded metal particles surrounding a metal shaft that extended beyond the ends of the plastic material. The metal shaft was grounded.

In U.S. Pat. No. 4,737,809, Konno taught a camera fitted with two guide rollers in pressure contact with the film. Both guide rollers were in further contact with springs that contacted grounding parts of the camera to remove static charges generated on the film under dry conditions.

Another roller for use with lengths of polymeric film was taught by Ko in U.S. Pat. No. 5,216,571. A metallic conducting core having a metal shaft at each end was surrounded by a non-conducting material having a helical groove cut into it. A conducting wire placed in the groove was in contact with a grounded bearing located at the end of one shaft. The wire had conducting needles radiating outwardly along its length.

Means to remove static electricity from photographic film was taught by Oosaka in U.S. Pat. No. 5,625,468. Four embodiments were described: a metal brush that contacted the perforated edge of the film; arms in contact with conducting members that made contact with each side of the film; conductive pins that contacted the edge of the film; and conductive flanges that contacted the edge of the film. All of these contact means were conductors and all were grounded.

All of the prior art devices for the prevention of sticking or bunching of flexible films or webs depended on the removal of the static electricity from the films or webs through one or another form of ground. There is a need for a simple means to prevent such sticking or bunching of films that can be used with a variety of film handling methods and apparatuses without the additional requirement of a ground.

BRIEF SUMMARY OF THE INVENTION

The present invention may be a guide or film transport roller for use with professional film handling and projection systems. In such systems the film may be introduced into the system by way of a film control plate and threaded over several film transport rollers as it passes to the projector after which it may return again by passing over a number of film transport rollers to a film receiving plate. The polymeric films used today may tend to develope a considerable charge of static electricity when utilized in such systems, especially under conditions of low atmospheric humidity. Such charges may cause the film to stick or bunch which in turn may necessitate that the projectionist stop the film and rethread it through the system. A modified film transport roller may be provided for use with polymeric flexible webs such as motion picture film which may prevent the film from sticking or bunching by polarizing static electric charges that may build up on the film as it moves through the film handling system.

It is an object of the present invention to provide a film transport roller that can be used with conventional film handling systems without the need to modify or change the systems.

Another object of the present invention is to provide a simple modification to film transport rollers such that they will polarize any static electric charges that may build up on the film.

A further object of the present invention is to provide a film transport roller that is easy and inexpensive to manufacture.

A still further object of the present invention is to provide a film transport roller that does not have to be grounded so that special considerations are not necessary in the placement of such rollers in a large or complex apparatus.

Another object of the present invention is to provide a film transport roller that can be interchanged with rollers already in use.

A film transport roller for use in polarizing static electric charges present on polymeric films with which it is in moving relationship comprising a non-conducting core having a cylindrical outer surface covered with a magnetized coating.

A method for preventing the bunching and sticking of a linear web that is passed through a web handling system requiring said web to travel a distance over a multiplicity of web transport rollers from a feed control member to a receiving member over which distance the web acquires a build-up of static electric charges, said method comprising the steps of providing a modified web transport roller having a cylindrical core, guide flanges disposed at each end of said core and a coating of magnetic polymeric material having an associated magnetic field surrounding the core and forming a web contacting surface of said roller; removing at least one web transport roller from the web handling system; replacing the web transport roller that has been removed with the modified web transport roller; threading the web through the web handling system; and running the web through the web handling system; whereby as the web passes over the modified web transport roller and through the magnetic field the static electric charges are polarized preventing the web from bunching and sticking.

A method for preventing the bunching and sticking of motion picture film that is passed through a film handling system requiring the film to travel a distance over a multiplicity of film transport rollers from a feed control plate to a projector and return to a film receiving plate over which distance the film acquires a build-up of static electric charges, said method comprising the steps of providing a modified film transport roller having a cylindrical core, collar means disposed at both ends of said core forming a film contacting surface of the roller, guide flanges disposed at each end of said core contiguous with said collar means and a coating of flexible magnetic polymeric material having an associated magnetic field surrounding the core and of a thickness less than the height of said collar means so that the film does not come in contact with the magnetic polymeric material but passes through the magnetic field; removing at least one film transport roller from the film handling system; replacing the film transport roller that was removed with the modified film transport roller; threading the film through the film handling system; and running the film through the film handling system; whereby as the film passes over the modified film transport roller and through the magnetic field the static electric charges are polarized preventing the film from bunching and sticking.

These and other features and advantages of the invention will be seen from the following description and drawings wherein similar reference characters are used to designate corresponding parts in all views.

DETAILED DESCRIPTION OF THE INVENTION

Figure 1:
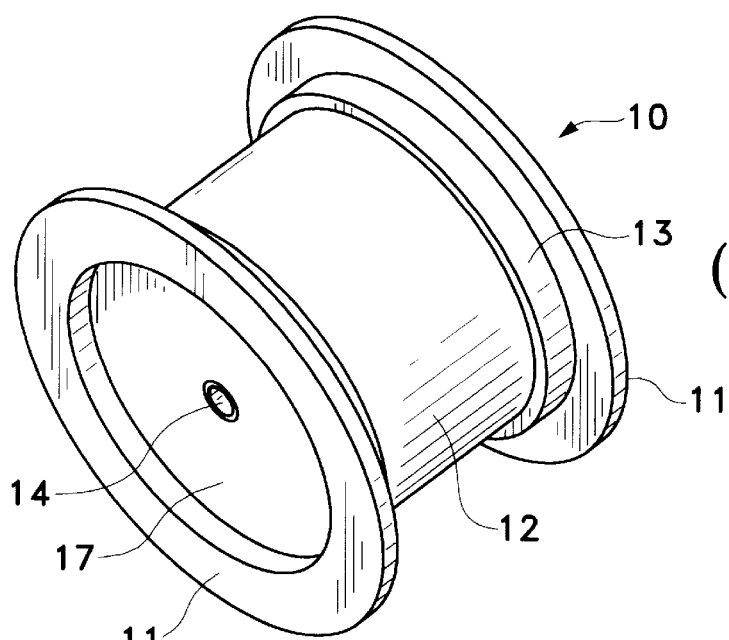
FIG. 1 is a side perspective view of a film transport roller for use with a film handling system.
Figure 2:
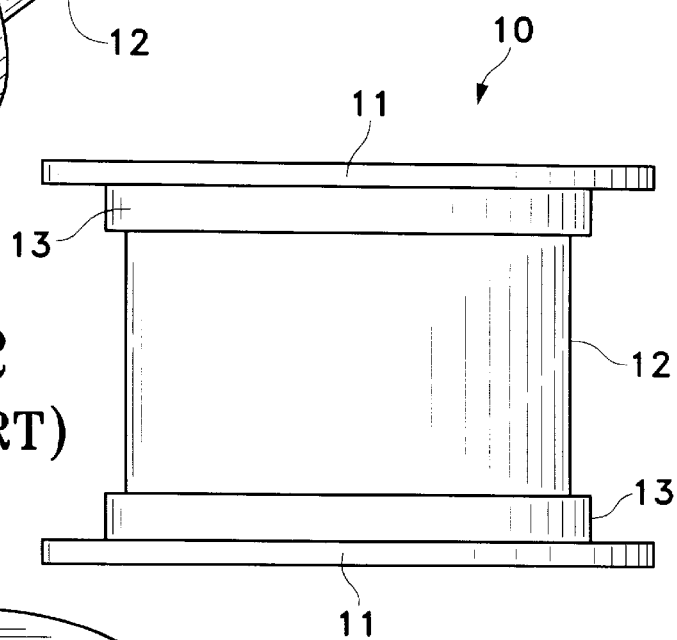
FIG. 2 is a side plan view of the film transport roller of FIG. 1.
Figure 3:
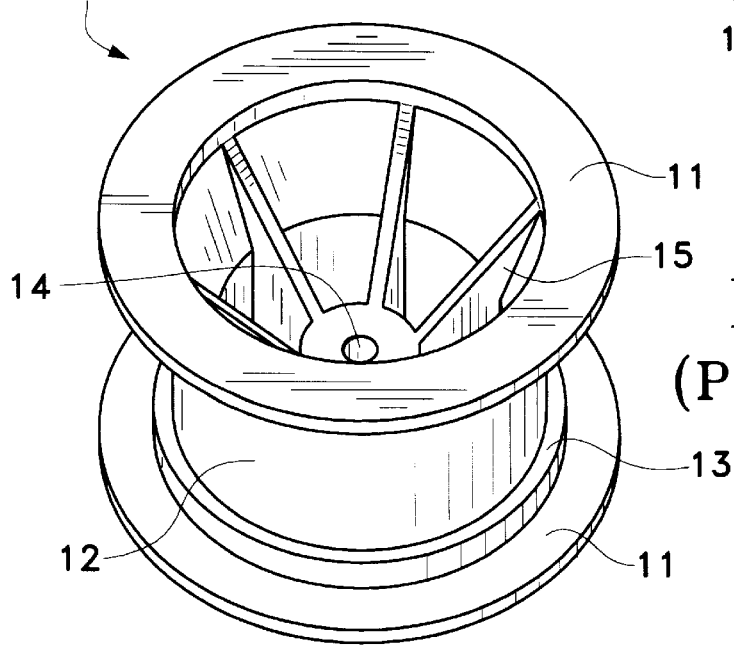
FIG. 3 is a bottom perspective view of a film transport roller.

Referring to FIGS. 1, 2 and 3, a film transport roller 10 for use with a film handling system 30 may be seen. The film transport roller 10 may have a cylindrical central portion or hub 12 disposed between two flanges 11. The hub 12 may have an elevated collar 13 at each end adjacent the flanges 11. As the film passes over the film transport roller 10 it may be guided between the flanges 11 so that it is maintained in proper alignment as required by the film handling system 30. To protect the central or vital portion of the film it may make contact only with the collars 13. With typical motion picture film only the sprocketed edges of the film 28 may make contact with the collars 13 of the film transport roller 10.

There may be an axial central opening 14 through the hub 12 for the introduction of a spindle (not shown) to support the film transport roller 10 in a film handling system 30. One side of the hub 12 may be covered by a face plate 17 while the other side may be open exhibiting a hollow interior. There may be reinforcing ribs 15 within the hollow interior of the hub 12. Similar rollers with slightly different internal configurations may also be used. The film transport rollers 10 of this type may be used to guide the film and facilitate its smooth and rapid advance as it is moved through the film handling system 30. These film transport rollers may be constructed of non-conducting materials such as plastics.

The film 28 may travel a considerable distance as it moves to and from the projector. It may be quite common for static electric charges to build up on the surface of the film 28 causing it to bunch and stick. This problem may be especially exacerbated in dry environments. The static charges may result in one section of film 28 being attracted to or adhering to another section in close proximity to it. This attraction may be responsible for the bunching and sticking of the film 28. To prevent this bunching or sticking the film transport roller 10 may be modified to polarize the static charges. The polarization may prevent the film from bunching and sticking because the uniform charges resulting from the polarization may prevent one section of film from adhering to or attracting another.

Figure 4:
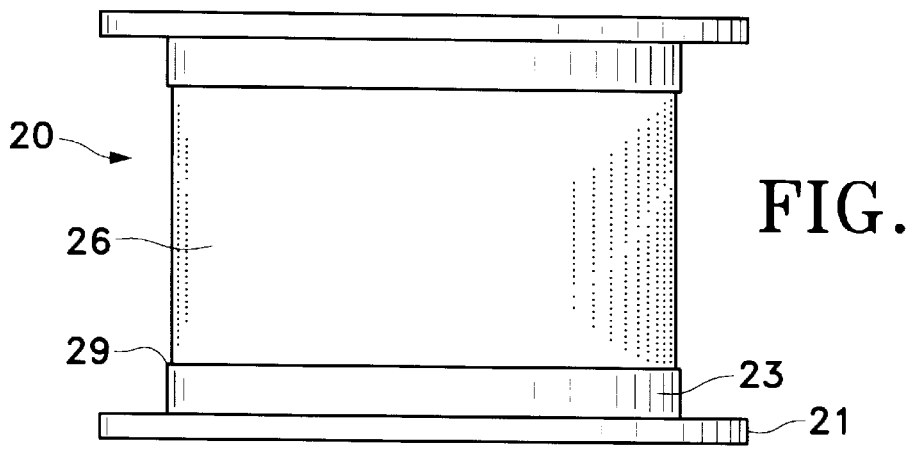
FIG. 4 is a side plan view of a film transport roller modified according to the present invention.
Figure 5:
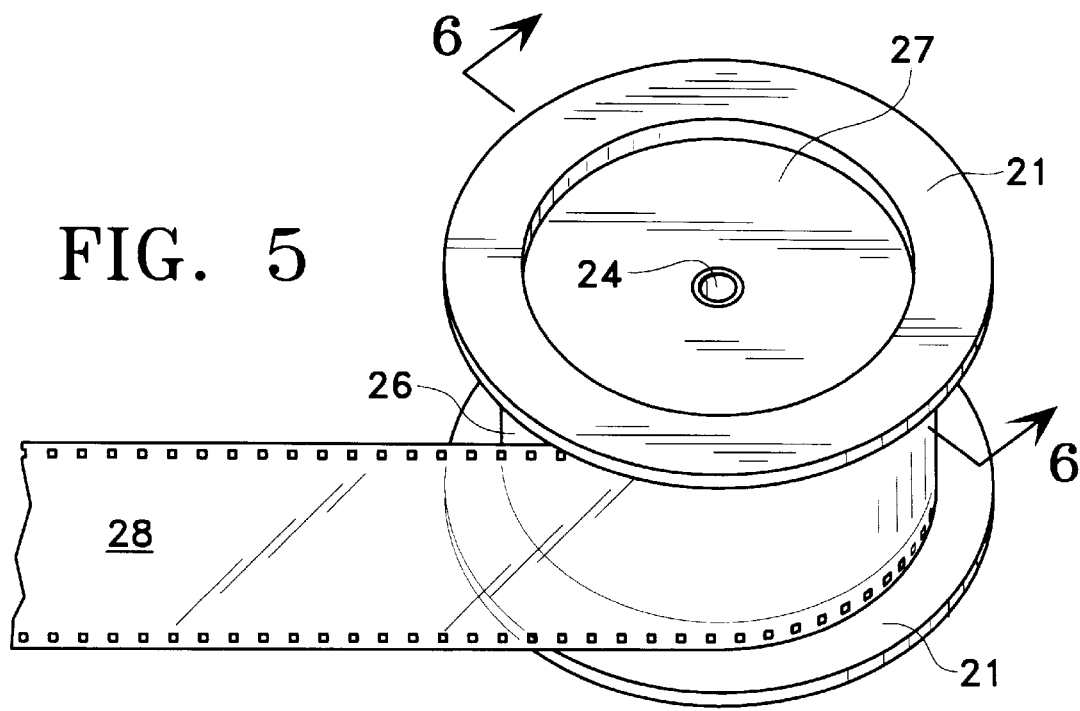
FIG. 5 is a a top perspective view of the modified film transport roller in use with film.
Figure 6:
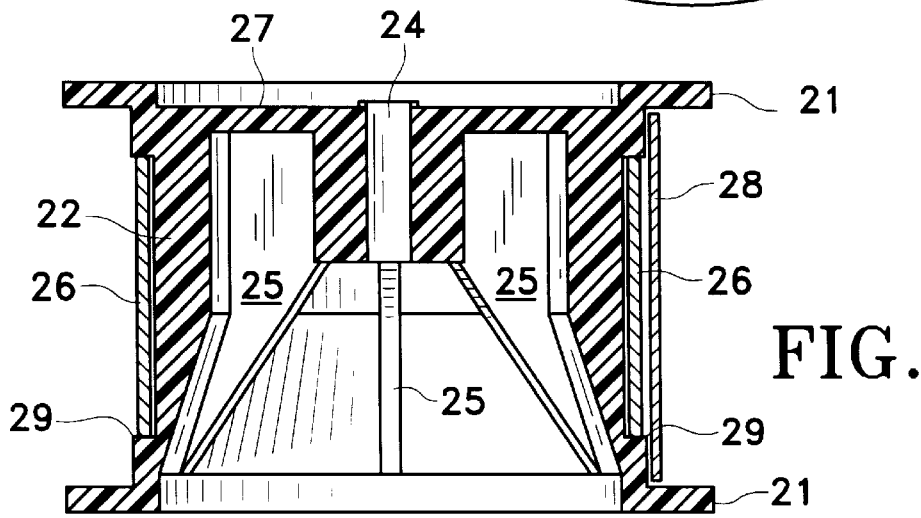
FIG. 6 is a section through line 6—6 of FIG. 5.

The modified film transport roller 20 seen in FIGS. 4, 5 and 6 may have the same basic structures, i.e., a cylindrical hub 22 disposed between two flanges 21, central opening 24, face plate 27 covering one side, interior reinforcing ribs 25, and collars 23 on each side of the hub 22 adjacent the flanges 21, as the conventional roller 10. A flexible magnetic strip 26 may be placed over and completely surround the hub 22 between the two collars 23. The strip 26 may be affixed to the surface of the hub 22 using a suitable adhesive. The magnetic material may also be applied as a polymeric layer directly to the central portion of the hub 22 by a variety of methods. The magnetic strips, adhesives and the method of application of polymeric layers are all known in the art. Flexible magnetic strips 26 may be purchased in varying widths. A typical magnetic strip that is one inch wide may be obtained from General Tools Manufacturing Company of New York, N.Y.

The magnetic strip 26 may be dimensioned to fit exactly between and abut the vertical edges of the collars 23. If it is necessary to protect the central portion of the film 28 the thickness of the magnetic strip 26 may be such that it does not quite reach the top of the collars 23, thus leaving a small ledge 29 above the surface of the magnetic strip 26 so there is no contact between the film 28 and the surface of the magnetic strip 26. This may be seen in FIGS. 4 and 6. The two ends of the magnetic strip 26 (not shown) may abut each other with no gap therebetween. The point of joinder of the two ends of the magnetic strip 26 must be smooth so that no edges project outward which could cause damage to the film 28.

When the film 28 passes over the modified film transport roller 20, the edges of the film 28 may rest on the collars 23. Because of the ledges 29, the film 28 may not touch the magnetic strip 26, as noted above, but may pass just above it and well within its magnetic field. See FIGS. 5 and 6.

As the film 28 passes over the magnetic strip 26 static charges on the film 28 may become polarized. The polarization may prevent any attraction or adherence of one portion of the film 28 to another thereby eliminating instances of bunching or sitcking of the film 28.

Figures 7, 7A:
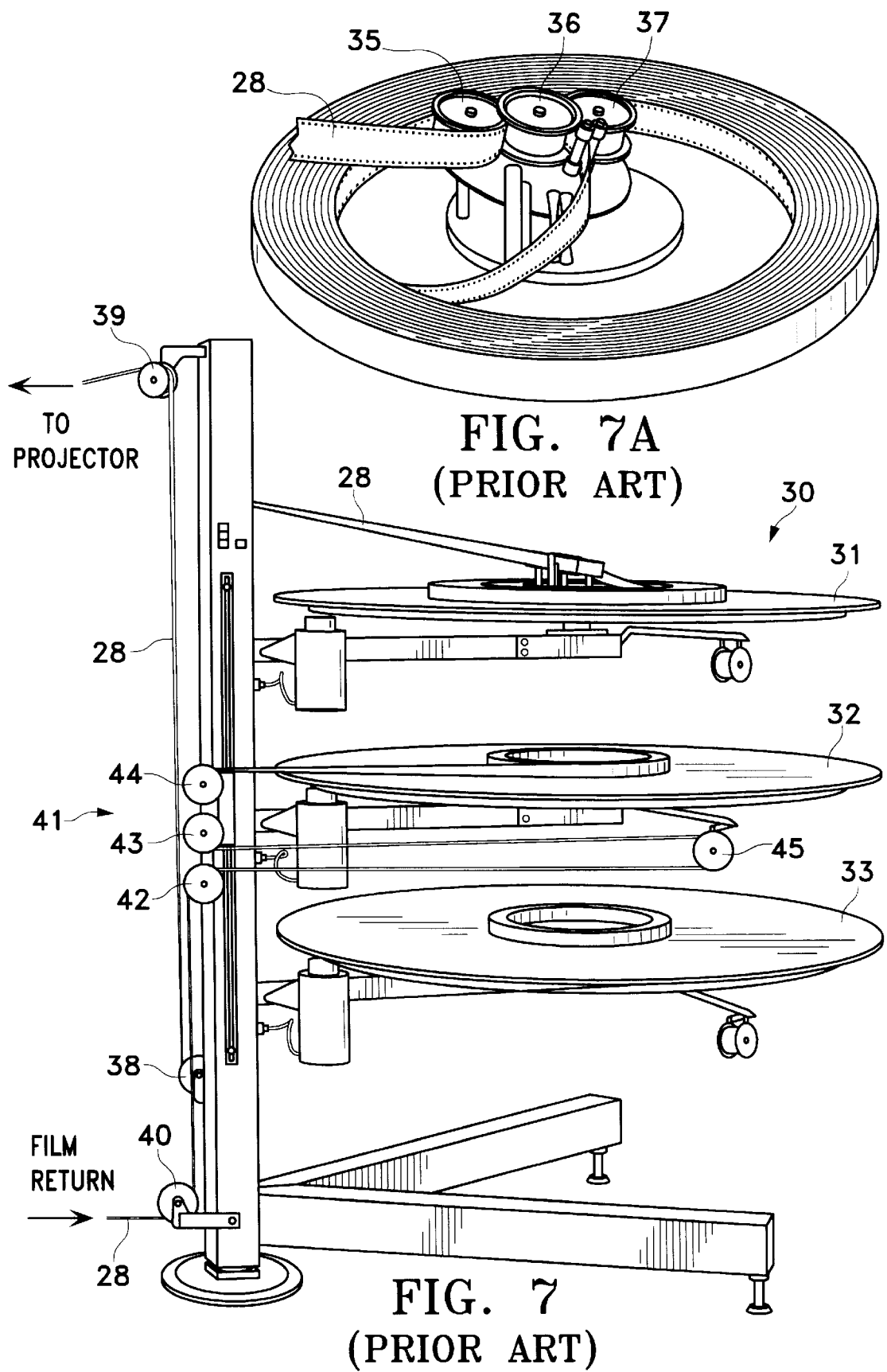
FIG. 7 is side plan view of a typical film handling system.
FIG. 7A is perspective isolated view of the feed control plate threading found in FIG. 7.

A typical film handling system 30 may be seen in FIG. 7. The film 28 may be dispensed from the film control plate 31 by being threaded through a series of film transport rollers 35, 36 and 37. A close-up view of the threading of the film control plate 31 may be seen in FIG. 7A. The film 28 may thereafter pass over one idler roller assembly (not shown), over another idler roller assembly 38, and over a top roller assembly 39 as it moves to the projector (not shown). Thereafter, the film 28 may be returned to the film handling system 30 again passing over a further series of rollers. The return path may be over the bottom roller assembly 40, the lowermost roller 42 of the cluster roller assembly 41, the plate roller 45, the middle cluster roller 43, the upper cluster roller 44 and finally to be rewound on the film receiving plate 32. A spare plate 33 may also be present in the system 30. Such a film handling system may be the TD-549 manufactured by Christie Incorporated of Cypress, Calif.

All of the film transport rollers used in the film handling system 30 may be of the same design and dimensions. Any or all may be replaced with the modified film transport roller 20. However, the static build-up may be realized to the greatest extent as the film 28 is returned from the projector. Since two sections of film 28 must be in close proximity for the sticking to occur, the area most susceptible to this phenomena may be the area where the film 28 passes over the lowermost cluster roller 42, the plate roller 45 and the middle cluster roller 43. In this area two long sections of film 28 are moving very close together. By replacing the lowermost cluster roller 42 and plate roller 45 both sides of the film may be exposed to the magnetic field. These two replacements may be sufficient to prevent the bunching and sticking of the film 28, but, as noted above, since all film transport rollers 10 may be of the same dimensions, any or all may be replaced by the modified roller 20 as it may be deemed necessary.

Replacing the conventional film transport rollers 10 with the modified roller 20 of the instant invention may require no grounds or other adjuncts so that the conventional film handling systems may require no additional modifications.

While one embodiment of the present invention has been illustrated and described in detail, it is to be understood that this invention is not limited thereto and may be otherwise practiced within the scope of the following claims.

TITOR PARTS LIST

- 10 film transport roller
- 11 flange
- 12 hub
- 13 collar
- 14 opening to receive spindle
- 15 reinforcing rib
- 16
- 17 face plate
- 18
- 19
- 20 modified film transport roller
- 21 flange
- 22 hub
- 23 collar
- 24 opening to receive spindle
- 25 reinforcing rib
- 26 magnetic strip
- 27 face plate
- 28 film
- 29 ledges between strip and top of collar
- 30 film handling system
- 31 feed control plate
- 32 film receiving plate
- 33 spare plate
- 34
- 35 film control roller
- 36 film control roller
- 37 film control roller
- 38 idler roller assembly
- 39 top roller assembly
- 40 bottom roller assembly
- 41 cluster roller assembly
- 42 lowest cluster roller
- 43 middle cluster roller
- 44 upper cluster roller
- 45 plate roller

What is claimed is:

1. A film transport roller for use in polarizing static electric charges that are present on polymeric films with which it is in moving relationship, said roller comprising:
    a non-conducting core having a cylindrical outer surface and
    a magnetized coating covering said outer surface.

2. A device as in claim 1 wherein said magnetized coating comprises a layer of polymeric material containing magnetized particles.

3. A device as in claim 1 further comprising collar means disposed at each end of said core forming a film contacting surface of said roller.

4. A device as in claim 3 wherein said magnetized coating is of a thickness less than the height of said collar means such that said film does not come in contact with said coating.

5. A device as in claim 1 further comprising flange means disposed at each end of said core for guiding said film over said roller.

6. A device as in claim 1 further comprising an axial bore for the introduction of a spindle to support said roller and permit said roller to revolve.

7. A method for preventing the bunching and sticking of a linear web that is passed through a web handling system requiring said web to travel a distance over a multiplicity of web transport rollers from a feed control member to a receiving member over which distance the web acquires a build-up of static electric charge, said method comprising the steps of:

providing a modified web transport roller having a cylindrical core, guide flanges disposed at each end of said core and a coating of magnetic polymeric material having an associated magnetic field surrounding the core and forming a web contacting surface of said roller;

removing at least one web transport roller from the web handling system;

replacing the web transport roller that has been removed with the modified web transport roller;

threading the web through the web handling system; and running the web through the web handling system; whereby as the web passes over the modified web transport roller and through the magnetic field the static electric charges are polarized preventing the web from bunching and sticking.

8. A method for preventing the bunching and sticking of motion picture film that is passed through a film handling system requiring the film to travel a distance over a multiplicity of film transport rollers from a feed control plate to a projector and return to a film receiving plate over which distance the film acquires a buildup of static electric charges, said method comprising the steps of:

provided a modified film transport roller having a cylindrical core, collar means disposed at both ends of said core forming a film contacting surface of the roller, guide flanges disposed at each end of said core contiguous with said collar means and a coating of flexible magnetic polymeric material having an associated magnetic field surrounding the core and of a thickness less than the height of said collar means so that the film does not come in contact with the magnetic polymeric material but passes through the magnetic field;

removing at least one film transport roller from the film handling system;

replacing the film transport roller that was removed with the modified film transport roller;

threading the film through the film handling system; and running the film through the film handling system; whereby as the film passes over the modified film transport roller and through the magnetic field the static electric charges are polarized preventing the film from bunching and sticking.

9. The method of claim 8 wherein the film transport roller removed is proximate the film receiving plate.

* * * * *